F. DEMARTINI & J. CHERTIZZA.
Improvement in Method of Ballasting Vessels in Port.
No. 126,938. Patented May 21, 1872.
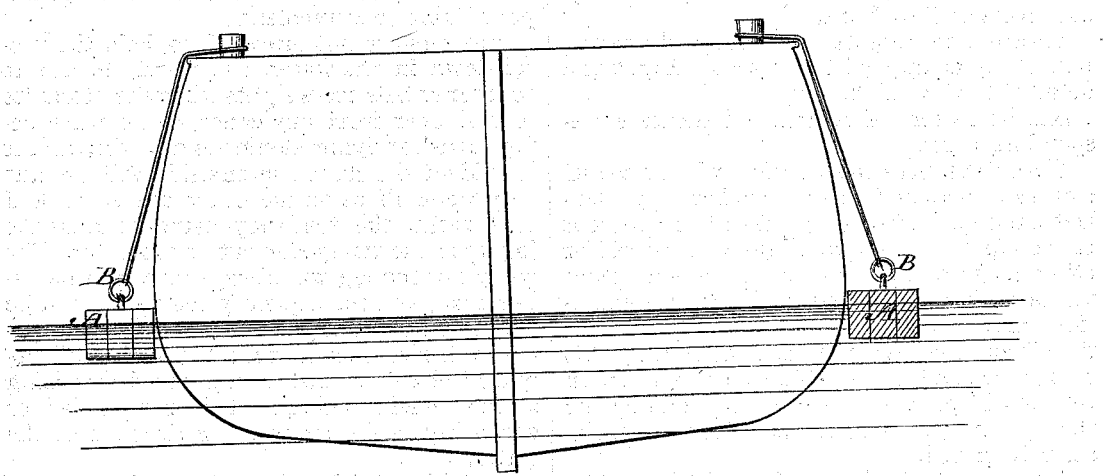
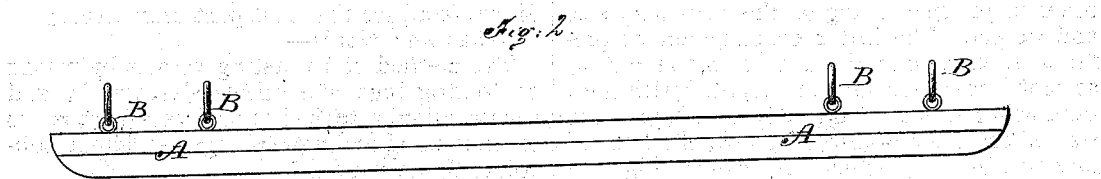

UNITED STATES PATENT OFFICE.

FRANCESCO DEMARTINI AND JOHN CHERTIZZA, OF BROOKLYN, NEW YORK.

IMPROVEMENT IN METHODS OF BALLASTING VESSELS IN PORT.

Specification forming part of Letters Patent No. 126,938, dated May 21, 1872.

Specification describing a new and useful Improvement in Floating Ballast-Log, invented by FRANCESCO DEMARTINI and JOHN CHERTIZZA, of Brooklyn, in the county of Kings and State of New York.

Figure 1 represents our improved floating ballast-log as applied to a vessel. Fig. 2 is a detail side view of the same.

Similar letters of reference indicate corresponding parts.

Under the present practice, when a vessel arrives in port and discharges her cargo, ballast must be immediately taken in to prevent careening and consequent injury to herself or other crafts, as well as to facilitate repairs and various other operations incident to preparation for a new voyage. To avoid the loss of time and the expense, &c., attending this course, we employ ballast-logs, connected with the vessel by ropes or chains that lie alongside thereof, and yet float in the water, as hereinafter described.

A represents our ballast-log, which may be made of a single stick of timber, or it may be made of smaller sticks of timber bolted to each other to produce a log of the necessary size and weight. The latter construction we prefer, as it enables the log A to be made hollow, so that it may be loaded or weighted with lead, iron, or other heavy material, according to the size of the vessel—that is to say, the ballast-logs will be proportioned in size or weight to the vessel to which they are to be applied. The logs are in all cases designed to float or be self-sustaining in the water, and thus made capable of being towed from place to place or vessel to vessel. They are attached to the vessel by ropes or chains passing through eye-bolts B or other convenient devices, and over the deck, or around any suitable part of the frame-work, or otherwise secured, as found practicable or convenient.

The logs are not intended to hold the vessel down in the water, but merely to act as counter or balance-weights when she attempts to keel over from any cause, either when being towed or lying alongside a wharf; and it is evident the chains on one side will be taut only when those on the other are slack, and vice versa, the tendency being to raise the log upon the rising side out of the water. The weight of the log will always prevent this being done, and consequently the vessel will be held in an upright position.

It will also be seen that the chains will require to be shortened or lengthened according as the vessel is being loaded or unloaded, or according as she sinks in or rises out of the water.

An incidental but important advantage of our ballast-logs is their adaptability to the office of fenders, rendering the use of the ordinary kind for the most part unnecessary.

What we claim is—

The method of ballasting vessels by means of floating logs of suitable size, weight, and construction, attached to said vessels by ropes or chains, and arranged alongside thereof, substantially as specified.

FRANCESCO DEMARTINI.
JOHN CHERTIZZA.

Witnesses:
JAMES T. GRAHAM,
T. B. MOSHER.